United States Patent [19]

Ellermann et al.

[11] Patent Number: 4,669,366
[45] Date of Patent: Jun. 2, 1987

[54] ALUMINUM PLUNGER PISTON WITH THERMAL EXPANSION REGULATING STRIP, FOR INTERNAL COMBUSTION ENGINES

[75] Inventors: Jürgen Ellermann, Winnenden; Horst Pfeiffenberger, Fellbach; Emil Ripberger, Remseck, all of Fed. Rep. of Germany

[73] Assignee: Mahle GmbH, Fed. Rep. of Germany

[21] Appl. No.: 760,929

[22] Filed: Jul. 31, 1985

[30] Foreign Application Priority Data

Aug. 16, 1984 [DE] Fed. Rep. of Germany ....... 3430132

[51] Int. Cl.⁴ .............................................. F16J 1/04
[52] U.S. Cl. ....................................... 92/225; 92/228; 92/229
[58] Field of Search ................. 92/177, 225, 226, 228, 92/229, 230

[56] References Cited

U.S. PATENT DOCUMENTS 4,314,531  2/1982  Bruni ..................................... 92/228

FOREIGN PATENT DOCUMENTS 1073257  1/1960  Fed. Rep. of Germany ........ 92/230
2733269  1/1978  Fed. Rep. of Germany ........ 92/229
393076   6/1933  United Kingdom ................. 92/228

Primary Examiner—Craig R. Feinberg
Attorney, Agent, or Firm—James C. Wray

[57] ABSTRACT

In a plunger piston for internal combustion engines, having a regulating strip in the piston body, the regulating strip is arranged in the axial middle third of the height of the piston body and the regulating effect is designed so that the piston body possesses its narrowest installation play uniformly at the level of the regulating strip equally in the cold installation state and in the engine operation. Above and below this region with minimum installation play the piston body possesses spherically retracted end regions at its upper and lower ends for the generation of hydrodynamic lubricant oil wedges.

6 Claims, 2 Drawing Figures

ALUMINUM PLUNGER PISTON WITH THERMAL EXPANSION REGULATING STRIP, FOR INTERNAL COMBUSTION ENGINES

BACKGROUND TO THE INVENTION

The invention relates to an aluminum plunger for internal combustion engines having thermal expansion regulating strips of steel in the piston body.

STATEMENT OF PRIOR ART

Such "regulated pistons" have long been known in the most various forms of embodiment. They are also used to a great extent in practice.

With regulated pistons of this kind it is intended above all to improve the smoothness of running of pistons, expecially in heavily stressed Otto and Diesel engines for passenger cars. The thermal expansion can be influenced in the desired direction by the casting of members of ring or plate form of steel into the piston body.

In low-stressed pistons the ring part is often separated from the body in the thrust direction and counter-thrust regions by a slot. Thus firstly the body which is to be regulated is partially separated from the rigid piston crown. Furthermore an additional favorable regulating effect is achieved by the conducting of the heat flux away in the direction of the gudgeon pin bores.

The regulating members may be of ring or plate (or strip) form. The annular regulating members are inserted at the upper body end and hinder the thermal expansion essentially only in a quite narrow region at the upper body end. Strips of plate form cast into the region of the pin bores on the other hand have a relatively great effect in the entire body region. While the coefficient of thermal expansion is reduced in comparision with that of the piston material in the thrust and counter-thrust regions the strip effect leads to an increase of this coefficient in the bolt direction.

In all known thermal expansion regulated pistons the regulating members and the configuration of the piston body are adapted to one another in such a way that the thermal expansion of the piston in the thrust and anti-thrust regions is minimal either at the upper or at the lower end of the body.

If with such piston designs it is intended to realise a body form in which the upper and lower body ends the end regions are constricted slightly spherically to generate a hydrodynamically acting lubricant film wedge, if as usual the region of narrowest play is placed between piston body and cylinder wall in the section of minimum expansion, this has the disadvantage that a close guidance, necessary for minimum noise generation in all operational conditions of the piston, is not possible.

OBJECT OF THE INVENTION

An object of the invention is to provide a piston body in which, by precise arrangement of the regulating strips, the piston is regulated into such expansion behaviour that despite the hydraulic lubricant wedge sections provided at the upper and lower body ends, guidance of the piston with low noise in all operational conditions is reliably guaranteed.

SUMMARY OF THE INVENTION

According to the invention there is provided an aluminum plunger piston for internal combustion engines, comprising a piston head provided with grooves to accommodate piston rings, a skirt integral therewith having an outer bearing surface, and bosses through which bores are formed to receive the gudgeon pin, the improvement comprising (a) at least one horizontally extending thermal expansion regulating strip is located at each of the skirt inner surfaces extending circumferentially between the boss bores, and lying entirely within the region of the axially middle third of the skirt in the thrust and anti-thrust regions of the skirt, (b) the outer bearing surface of the piston skirt is reduced in diameter at its ends in each case gradually over an axial length of 5 to 10% of the piston diameter so that the skirt is substantially barrel-shaped, said remaining portion of the skirt lying axially between the reduced skirt ends having an axial dimension of 5 to 30% of the piston diameter, and (c) the portion of the skirt lying axially between the reduced skirt ends comprises the maximum skirt external diameter in the circumferential regions adjacent the plane of oscillation of the connecting rod at right-angles to the bore axis when the uniform piston temperature has risen to about 150 degrees C., whereby in use within a cylinder bore the clearance between the reduced ends of the skirt and the wall of the cylinder bore is greater than the clearance between the bearing surface and the cylinder wall under all operating conditions, the clearance at the reduced ends increasing axially respectively towards the ends of the skirt.

The particular advantage of the embodiment according to the invention consists in that the piston can have its narrowest installation clearance in the axially middle piston region in both the cold and hot operational conditions in the engine, since due to the provided position of the regulating strip and its adaptation in regulating effect with the body construction, the region of the minimum thermal expansion on the strips lies axially between the upper and lower radial constrictions of the body.

BRIEF DESCRIPTION OF DRAWINGS

An example of embodiment of the invention is represented in the drawing, wherein.

DESCRIPTION OF PREFERRED EMBODIMENTS

Figure 1:
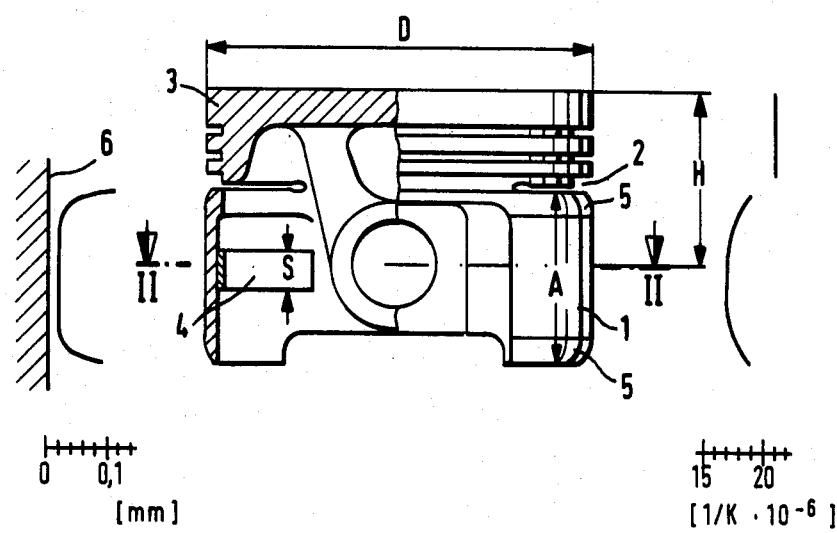
FIG. 1 shows a piston partially in longitudinal section, partially in elevation.
Figure 2:
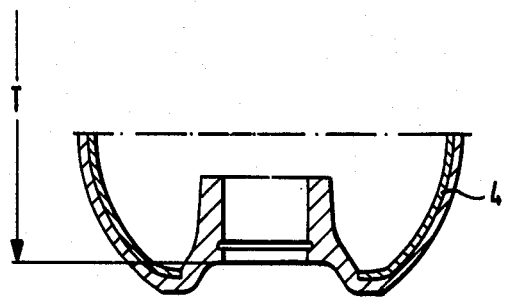
FIG. 2 shows a section through the piston along the line II—II.

The piston consists of a cast aluminum-silicon alloy. The piston skirt 1 is separated in the thrust and anti-thrust regions from the piston crown 3 by a horizontal slot extending through the lowermost ring groove 2. The diameter of the piston amounts to D=95 mm. The compression height measures H=43 mm. In the region of about 50 degrees adjoining the connecting rod oscillation plane on each of the two sides of this plane, the piston skirt height amounts to about A=43 mm. The axial height of the strip amounts to 5 to 25% of the piston diameter (e.g. S=8 mm). The axial middle of the strip lies 2.5 mm. above the middle of the skirt height A. The distance between the radially outermost pin boss end faces T is 65 mm.

Considered axially of the gudgeon pin the skirt is 10% shorter than the piston diameter. The regulating strips 4 are located in the middle third of the axial height A of the piston skirt in the thrust and anti-thrust regions of the piston and extend into the walls of the pin bosses. At each of the upper and lower skirt ends the piston skirt is formed on its outer surface with inwardly advised regions 5, in each case extending over a height of 10-40% of the piston diameter (e.g. 5 mm). The regions 5 may have a radius of 0.2 mm. The resulting exterior skirt is accordingly barrel-shaped with the minimum diameter of the reduced ends less than the maximum diameter of the skirt by 0.1 mm under operating conditions.

The portion of the skirt lying axially between the reduced skirt ends comprises the maximum skirt external diameter in the circumferential regions adjacent the plane of oscillation of the connecting rod at right-angles to the bore axis when the uniform piston temperature has risen to about 150 degress C.

In use within the cylinder bore the clearance between the reduced ends of the skirt and the wall of the cylinder bore is greater than the clearance between the bearing surface and the cylinder wall under all operating conditions, the clearance at the reduced ends increasing axially respectively towards the ends of the skirt.

On the left beside the piston in FIG. 1 the body contour is shown in a section along the piston axis and perpendicularly of the pin axis. Beneath the illustrated skirt profile the radial length values are entered in mm. The cylinder running surface is indicated by the wall 6. The radial installation play of the piston in the cold condition amounts in the middle of the regulating strip to about 0.02 mm. The corresponding radial installation plays amount at the upper skirt end to 0.12 mm. and at the lower skirt end to 0.1 mm.

On the right beside the piston in FIG. 1 there is shown the curve of the thermal expansion coefficients in the case of uniform heating to 150 degrees C. (Basic expansion of the piston alloy of this example$=21\times10^{-6}$ mm./mmk) of the piston skirt. Beneath the curve there are entered the relevant values of the expansion coefficients. This curve of the thermal expansion values shows quite clearly the position of minimum thermal expansion in the region of the position of the regulating strip 4.

We claim:
1. In an aluminum plunger piston for internal combustion engines, comprising a piston head provided with grooves to accommodate piston rings, a skirt formed integral therewith having an outer bearing surface axially spaced from the piston head, and bosses through which bores are formed to receive a gudgeon pin, the improvement comprising
    (a) at least one horizontally extending thermal expansion regulating strip is located at each of inner surfaces of the skirt extending circumferentially between the boss bores, being spaced from one another and lying entirely within a region consisting of an axially middle third of the skirt in thrust and anti-thrust regions of the skirt,
    (b) the outer bearing surface of the piston skirt is reduced in diameter at its ends in each case gradually over an axial length of 5 to 10% of a predetermined maximum diameter of the piston so that the skirt is substantially barrel-shaped, a remaining portion of the skirt lying axially between the reduced skirt ends having an axial dimension of 5 to 30% of the maximum piston diameter, and
    (c) a portion of the skirt lying axially between the reduced skirt ends comprises maximum skirt external diameter in circumferential regions adjacent a plane of oscillation of a connecting rod at right-angles to the bore axis when a uniform temperature of the piston has risen to about 150 degrees C.,
whereby in use within a cylinder bore a clearance between the reduced ends of the skirt and a wall of the cylinder bore is greater than that between the bearing surface and the cylinder bore wall under all operating conditions, the clearance at the reduced ends increasing axially respectively towards the respective ends of the skirt; and wherein the regulating strips are embedded in body material of the piston only at their ends, for the remainder they abut along the inner surface of the skirt at least on their external circumference and they have no contact with the body material at least on their internal circumference.

2. A plunger piston according to claim 1, wherein a minimum diameter of the reduced ends of the skirt is less than the maximum diameter of the skirt by 0.1 mm under operating conditions.

3. A plunger piston according to claim 1, wherein only one regulating strip is arranged on each side of the boss bores, each strip having an axial dimension of between 5% and 25% of the maximum piston diameter.

4. A plunger piston according to claim 1, wherein the regulating strips extend circumferentially into a respective hub about the bosses.

5. A plunger piston according to claim 1, wherein the regulating strips extend circumferentially over a range of from 90 to 140 degrees.

6. A plunger piston according to claim 1, wherein the piston has the following dimensional relationships (H/D)=25-50%  (T/D)=45-80%  (A/D)=20-50% (s/D)=5-25%
where
    D=piston diameter
    H=dimension from the gudgeon pin boss bore axis to an upper surface of the piston head,
    T=distance between radially externally situated boss surfaces,
    A=skirt length in a region of intersection of the bearing surface with the plane of oscillation of the connecting rod
    s=total axial strip height.

* * * * *